United States Patent
Kaizu et al.

(10) Patent No.: US 7,735,110 B2
(45) Date of Patent: Jun. 8, 2010

(54) INFORMATION PROCESSING APPARATUS, INFORMATION PROCESSING METHOD, AND PROGRAM STORAGE MEDIUM

(75) Inventors: Tatsuo Kaizu, Tokyo (JP); Takuma Miyazaki, Tokyo (JP); Hiroyuki Hanaya, Kanagawa (JP)

(73) Assignee: Sony Corporation, Tokyo (JP)

(*) Notice: Subject to any disclaimer, the term of this patent is extended or adjusted under 35 U.S.C. 154(b) by 1720 days.

(21) Appl. No.: 10/039,826

(22) Filed: Oct. 23, 2001

(65) Prior Publication Data

US 2002/0097985 A1    Jul. 25, 2002

(30) Foreign Application Priority Data

Oct. 24, 2000    (JP)    ............... 2000-324016

(51) Int. Cl.
   *H04N 7/173*    (2006.01)
   *H04N 7/16*    (2006.01)

(52) U.S. Cl. .............. 725/140; 725/105; 725/109; 725/114; 725/115; 725/134; 725/142; 725/152

(58) Field of Classification Search ................. 725/141
   See application file for complete search history.

(56) References Cited

U.S. PATENT DOCUMENTS

| | | | |
|---|---|---|---|
| 5,537,473 A * | 7/1996 | Saward | 380/230 |
| 5,692,214 A * | 11/1997 | Levine | 710/13 |
| 6,304,660 B1 * | 10/2001 | Ehrhart et al. | 380/251 |
| 6,590,503 B1 * | 7/2003 | Elliott | 340/825.69 |
| 7,065,287 B1 * | 6/2006 | Heredia et al. | 386/52 |

FOREIGN PATENT DOCUMENTS

| | | |
|---|---|---|
| JP | 7-21619 | 1/1995 |
| JP | 9-180291 | 7/1997 |
| JP | 9-182173 | 7/1997 |
| JP | 9-298775 | 11/1997 |
| JP | 10-155029 | 6/1998 |
| JP | 10-224872 | 8/1998 |

* cited by examiner

*Primary Examiner*—Christopher Kelley
*Assistant Examiner*—Justin E Shepard
(74) *Attorney, Agent, or Firm*—Oblon, Spivak, McClelland, Maier & Neustadt, L.L.P.

(57) ABSTRACT

The present invention provides an information processing apparatus, an information processing method and a program storage medium. The user of a personal computer selects a television program to be preset recorded from a program guide stored in an EPG server and downloads the corresponding preset recording data. When, from the downloaded preset recording data, a recording start time is found reached, the personal computer selects commands for starting recording a channel to be recorded and transmits the selected commands from a video mouse as infrared signals. Receiving the recording start command, a VCR starts recording.

9 Claims, 15 Drawing Sheets

FIG. 3

| MAKER NAME | MANUFACTURE YEAR | COMMAND | | ADDRESS | |
|---|---|---|---|---|---|
| SONI | 1990~1999<br>SS 10<br>SS 20<br>SS 200<br>SS 220 | CHANNEL | NHK GENERAL<br>NHK EDUCATIONAL<br>NIHON TV<br>⋮ | A0<br>A1<br>A2<br>⋮ | COMMAND SET A |
| | | RECORDING START<br>RECORDING END | | A10<br>A11 | |
| | 2000~<br>SS 2000<br>SS 2100<br>SS 2200 | CHANNEL | NHK GENERAL<br>NHK EDUCATIONAL<br>NIHON TV<br>⋮ | B0<br>B1<br>B2<br>⋮ | COMMAND SET B |
| | | RECORDING START<br>RECORDING END | | B10<br>B11 | |
| Panason | 1990~1999<br>PP 50<br>PP 55<br>PP 60 | CHANNEL | NHK GENERAL<br>NHK EDUCATIONAL<br>NIHON TV<br>⋮ | C0<br>C1<br>C2<br>⋮ | COMMAND SET C |
| | | RECORDING START<br>RECORDING END | | C10<br>C11 | |
| | 2000~<br>PP 200<br>PP 210<br>PP 220 | CHANNEL | NHK GENERAL<br>NHK EDUCATIONAL<br>NIHON TV<br>⋮ | D0<br>D1<br>D2<br>⋮ | COMMAND SET D |
| | | RECORDING START<br>RECORDING END | | D1<br>D2 | |
| Toshibe | 1990~1999<br>TT 05<br>TT 10 | CHANNEL | NHK GENERAL<br>⋮ | E0<br>⋮ | COMMAND SET E |

FIG. 11

| BROADCAST GUIDE | | 1CH | | 3CH | | 4CH | | 6CH |
|---|---|---|---|---|---|---|---|---|
| | | NHK GENERAL | | NHK EDUCATIONAL | | NIHON TV | | TBS |
| 19:00 | 0 | 7 O'CLOCK NEWS<br>· TODAY'S NEWS<br>· SPORTS CORNER<br>· FOREIGN EXCHANGE RATE/<br>  STOCK INFORMATION<br>· WEATHER INFORMATION<br>CASTER    101-1 ®<br>                101-2 ® | 0 | AFTER-SCHOOL CLUB<br>WELCOME JUNIOR FELLOWS<br>            101-5 ® | 0 | PROFESSIONAL BASEBALL<br>"GIANTS VS. DRAGONS"<br>TOKYO DOME<br>COMMENTATOR:<br>    MOTODAI TOSHU<br>ANNOUNCER:<br>    NIIDATE SABURO<br>           101-10 ® | 0 | FRIDAY TV'S TAIYO 1<br>"EMERGENCY WARD<br>AROUND THE CLOCK"<br>            101-11 ® |
| | 57 | TV MAP | 30<br>45 | SIGN LANGUAGE CORNER ®<br>HEALTH TOMORROW ®<br>            101-6<br>            101-7 | | | | |
| 20:00 | 0 | DRAMA<br>"NANDARA KANDARA"<br>            101-3 ® | 0 | WITH YOU TONIGHT<br>            101-8 ® | | | | |
| | 45 | LOCAL WEATHER FORECAST<br>            101-4 ® | 30 | LET'S LEARN BRAILLE<br>            101-9 ® | | | | |

FIG. 12

SUBJECT:TVPI20000602l900

CONTENT-TYPE:APPLICATION/X-TV-PROGRAM-INFO;CHARSET=SHIFT_JIS
VERSION:1
STATION:NIHON TV
YEAR:2000
MONTH:06
DATE:02
START:19:00
END:20:54
PROGRAM-TITLE:PROFESSIONAL BASEBALL

~ NAGOYA DOME  GIANTS VS. DRAGONS   COMMENTATOR・MOTODAI TOSHU
    ANNOUNCER・NIIDATE SABURO
    (MAX. EXTENSION UP TO 0924;SUBSEQUENT PROGRAMS BROUGHT DOWN)

AFTER THE BENCH-CLEARING BRAWL WITH YOKOHAMA, TEAM LEADER
TACHIKAWA OF THE DRAGONS PUTTING MORE HEART INTO THE JOG,
IMPROVING THE TEAM'S CONDITION AS WELL AS HIS OWN BATTING
PERFORMANCE. HE CAN BE EXPECTED AS A POINT MAN IN THE NEXT
THREE-GAME SERIES WITH THE GIANTS.

FIG. 13

1, 0, 1, NHK GENERAL, NHK GENERAL, NHK
3, 0, 3, NHK EDUCATIONAL, NHK EDUCATIONAL, NHK2
4, 0, 4, NIHON TV, NIHON TV, NITTELE, NIHON TV BROADCAST NETWORK, NTV
5, 0, 5, SCOPE, SCOPE
6, 0, 6, TOKYO BROADCAST, TOKYO BROADCAST, TBS TV, TBS
8, 0, 8, FUJI TV, FUJI TV, FUJI TELEVISION, CX, FUJI
7, 0, 7, VAIO TV, VAIO TV, VAIO
9, 0, 9, NHK SATELLITE 2, NHK SATELLITE 2, BS2, NHKBS2
10, 0, 10, TV ASAHI, TV ASAHI, NATION-WIDE ASAHI BROADCAST, TV-ASAHI. TELE ASA, ANB, TVASA
11, 0, 11, NHK SATELLITE 1, NHK SATELLITE 1, BS1, NHKBS1
12, 0, 12, TV TOKYO, TV TOKYO, TELETO, TVTOKYO, TX, TVTOK

FIG. 14

YOU CANNOT PRESET THIS PROGRAM
FOR RECORDING BECAUSE THE DATA OF
PRESET RECORDING NUMBER 1 PARTIALLY
OVERLAP WITH RECORDING TIME

FIG. 15

SETTING OF PRESET RECORDING
HAS BEEN COMPLETED.

PRESET NUMBER : 2

INFORMATION PROCESSING APPARATUS, INFORMATION PROCESSING METHOD, AND PROGRAM STORAGE MEDIUM

BACKGROUND OF THE INVENTION

The present invention relates generally to an information processing apparatus, an information processing method and a program storage medium and, more particularly, to an information processing apparatus, an information processing method and a program storage medium for setting the preset recording of television programs on recording apparatuses of any makers by use of control information stored in a program information providing apparatus.

Recently, system services (for example, iEPG (trademark)) have begun in which television programs are preset or programmed for recording by use of program preset recording sites on the Internet. In these preset recording systems, each user accesses a program preset recording site from his personal computer and operates a preset recording button corresponding to a desired television program to download a corresponding text file described with station name, program name, and program start and end times for example.

When the program start time comes, the personal computer selects a corresponding broadcasting channel by its tuner, compresses the received data by the MPEG2 (Moving Picture Experts Group 2) standard for example, and records the compressed data to it its hard disk for example. This allows each user to preset desired programs for recording only by performing necessary operations on the Internet without having to perform cumbersome operations hitherto required in preset recording programs.

However, the above-mentioned television program preset recording system services basically require a personal computer for using the services, barring generally widespread VCRs (Video Cassette Recorders), which are television program recording apparatuses, from accessing these services.

SUMMARY OF THE INVENTION

It is therefore an object of the present invention to provide an information processing apparatus, an information processing method and a program storage medium which facilitate and speed up the preset recording of television programs on recording apparatuses of any makers.

In carrying out the invention and according to one aspect thereof, there is provided an information processing apparatus including: control information acquiring means for acquiring from a program information providing apparatus control information for controlling preset recording of a program; identification information acquiring means for acquiring identification information for identifying a recording apparatus by which the program is recorded; code information acquiring means for acquiring, on the basis of the identification information acquired by the identification information acquiring means, code information for controlling the recording apparatus, the code information corresponding to the control information acquired by the control information acquiring means; and transmitting means for transmitting the code information acquired by the code information acquiring means to the recording apparatus.

The above-mentioned transmitting means may transmit the code information to the recording means, the coding means instructing the recording means to execute one of operations for starting and ending a recording session.

The above-mentioned transmitting means may transmit the code information which instructs the recording apparatus to execute a preset recording operation.

The above-mentioned identification information acquiring means may acquire a maker name and a model name of the recording apparatus as the identification information.

The above-mentioned code information acquiring means may acquire the code information through a network.

The above-mentioned control information may include broadcast channel information, broadcast date, broadcast start time, and broadcast end time of the program.

In carrying out the invention and according to another aspect thereof, there is provided an information processing method including: a control information acquiring step of acquiring from a program information providing apparatus control information for controlling preset recording of a program; an identification information acquiring step of acquiring identification information for identifying a recording apparatus by which the program is recorded; a code information acquiring step of acquiring, on the basis of the identification information acquired in the identification information acquiring step, code information for controlling the recording apparatus, the code information corresponding to the control information acquired in the control information acquiring step; and a transmitting step of transmitting the code information acquired in the code information acquiring step to the recording apparatus.

In carrying out the invention and according to still another aspect thereof, there is provided a program storage medium storing a computer-readable program including: a control information acquiring step of acquiring from a program information providing apparatus control information for controlling preset recording of a program; an identification information acquiring step of acquiring identification information for identifying a recording apparatus by which the program is recorded; a code information acquiring step of acquiring, on the basis of the identification information acquired in the identification information acquiring step, code information for controlling the recording apparatus, the code information corresponding to the control information acquired in the control information acquiring step; and a transmitting step of transmitting the code information acquired in the code information acquiring step to the recording apparatus.

In the information processing apparatus, the information processing method and the program storage medium described above, the control information for controlling the preset recording of television programs is acquired from the program information providing apparatus as well as the identification information for identifying a recording apparatus on which a television program is recorded. On the basis of the acquired identification information, the code information, corresponding to the control information, for controlling the recording apparatus is acquired and the acquired code information is transmitted to the recording apparatus.

BRIEF DESCRIPTION OF THE DRAWINGS

These and other objects of the invention will be seen by reference to the description, taken in connection with the accompanying drawing, in which:

FIG. 3 is a diagram illustrating an exemplary command set;

FIG. 11 shows an exemplary program guide;

FIG. 12 shows exemplary preset recording data;

FIG. 13 shows an exemplary channel conversion file;

FIG. 14 shows an exemplary message;

FIG. 15 shows another exemplary message;

DETAILED DESCRIPTION OF THE PREFERRED EMBODIMENTS

Figure 1:
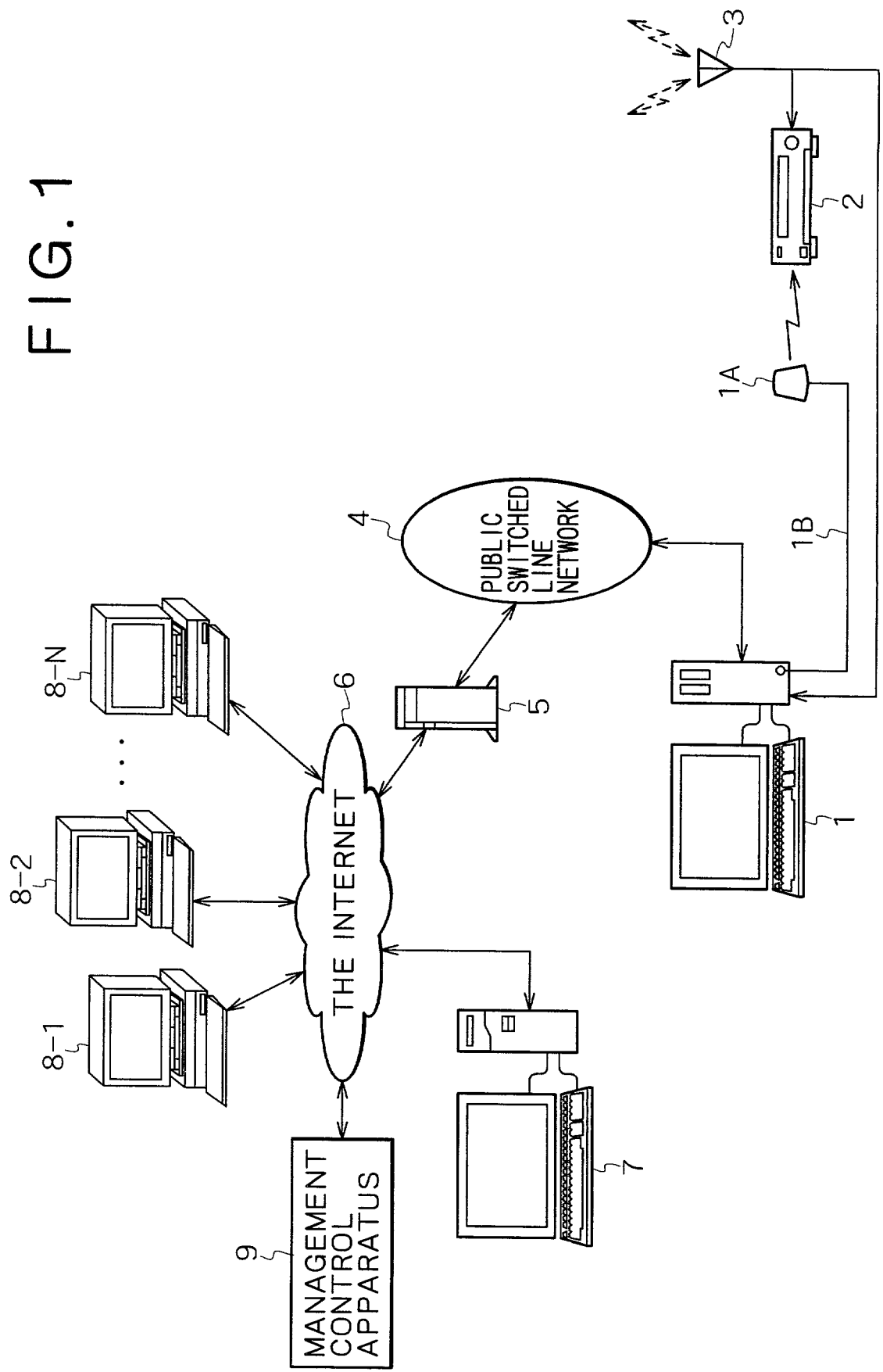
FIG. 1 is a schematic diagram illustrating a configuration of a preset recording system to which the present invention is applied.

This invention will be described in further detail by way of example with reference to the accompanying drawings. Now, referring to FIG. 1, there is shown an exemplary configuration of a program preset recording system practiced as one embodiment of the invention.

The personal computer 1 is supplied with signals which are obtained at an antenna 3 by converting the radio waves transmitted from a television station, not shown. Consequently, the user of the personal computer 1 can view desired television programs and record them to a hard disk 31A (FIG. 2) for example of the personal computer 1 if required.

When setting the preset recording of a program, the user of the personal computer 1 can make the necessary settings of broadcast channel and broadcast date for example by operating the keyboard for example of the personal computer 1. Alternatively, the user of the personal computer 1 can set preset recording by accessing an EPG (Electronic Program Guide) server 7 via a public switched line network 4, an access server 5, and the Internet 6 and using the downloaded preset recording data.

Further, the user can use the downloaded preset recording data to record television programs on the VCR 2. In this case, the personal computer 1, when a recording start time is found reached from the downloaded preset recording data, selects a recording start command corresponding to the model of the VCR 2 and transmits, as an infrared signal, the selected command from a video mouse 1A connected to the personal computer 1 via a USB (Universal Serial Bus) cable. Namely, when recording a television program on the VCR 2 by use of the preset recording data downloaded from the EPG server 7, the user must enter the information such as the model of the VCR 2 with the personal computer 1 in advance.

When a recording end time is found reached from the downloaded preset recording data, the personal computer 1 transmits a recording end command from the video mouse 1A to the VCR 2.

On the other hand, receiving the recording start command, the VCR 2 starts recording accordingly until a recording end command comes from the personal computer 1. Therefore, the video mouse 1A is disposed in the proximity of an infrared receiver 72 (refer to FIG. 5) of the VCR 2.

The personal computer 1 is connected to the Internet 6 via the public switched line network 4 and the access server 5.

The Internet 6 is connected to the EPG server 7, WWW (World Wide Web) servers 8-1 through 8-N, and a management control apparatus 9.

The EPG server 7 is a so-called Web server, storing, in its internal program database, a program guide listing programs to be broadcast by television stations in a predetermined area, such as Japan.

The EPG server 7 also stores preset recording data which allows the user to set the preset recording of each program in the personal computer 1 for example. These preset recording data are text data which describe the broadcast date, broadcast channel, and broadcast start and end times, and so on of each program, details of which will be described later.

The Internet 6 is connected to many WWW servers 8-1 through 8N. The WWW servers 8-1 through 8N provide various kinds of content to the personal computer 1 and so on in accordance with the TCP/IP protocol.

The management control apparatus 9 executes authentication processing and charging processing on the personal computer 1 and so on.

Obviously, the public switched line network 4 is connected with various devices in addition to the personal computer 1. For example, the recording on the VCR 2 can be controlled by accessing the EPG server 7 from a mobile phone for example, downloading preset recording data to the accessing mobile phone as with the personal computer 1, and transmitting a recording start command and so on to the VCR 2 as infrared signals.

Figure 2:
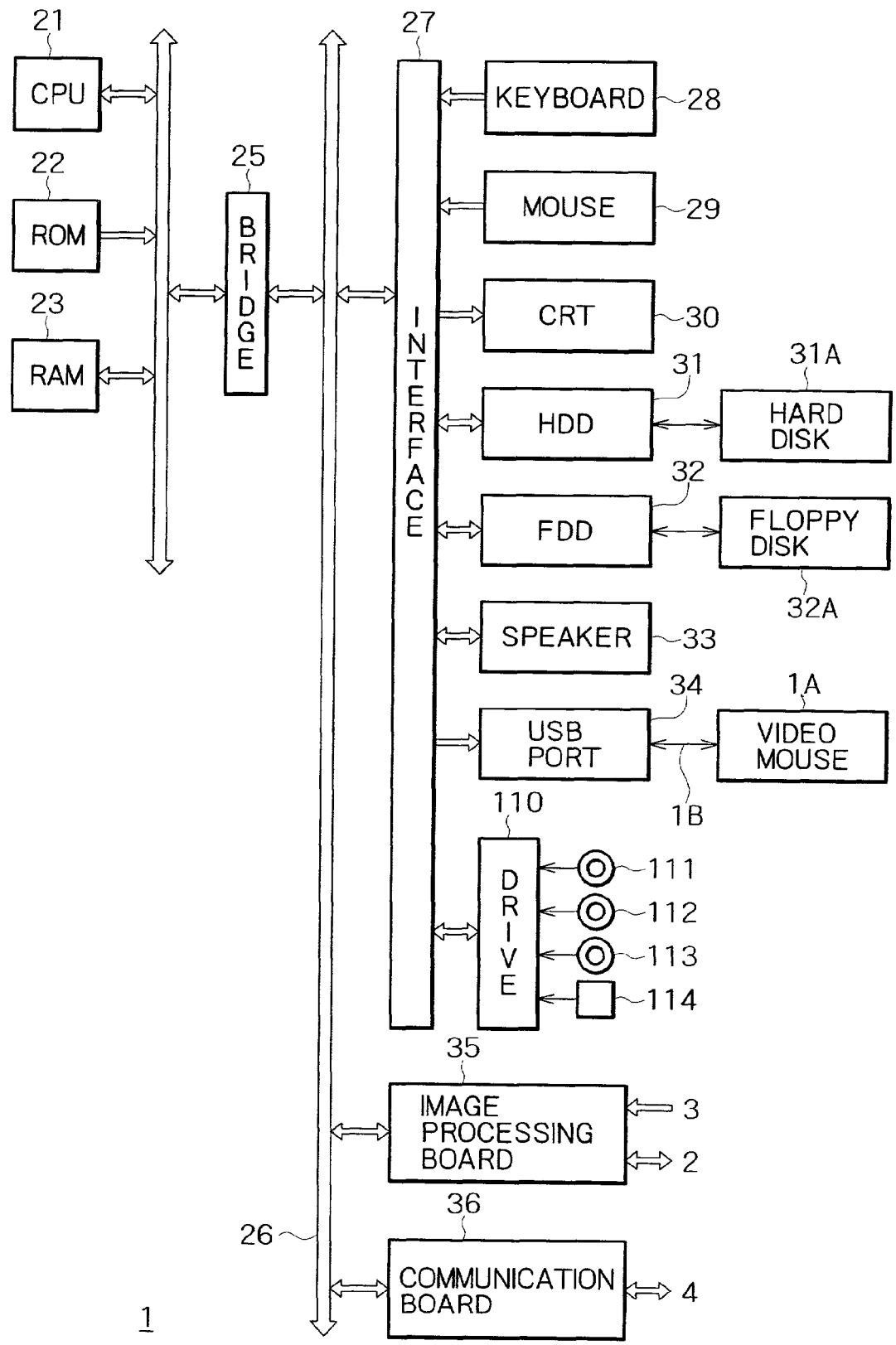
FIG. 2 is a block diagram illustrating a configuration of a personal computer shown in FIG. 1.

The following describes the configuration of each of the above-mentioned component apparatuses. Referring to FIG. 2, there is shown an exemplary configuration of the personal computer 1.

A CPU (Central Processing Unit) 21 actually executes various application programs and an OS (Operating System). A ROM (Read Only Memory) 22 generally stores computer programs and basically fixed data of computational parameters to be used by the CPU 21. The RAM (Random Access Memory) 23 stores computer programs to be used by the CPU 21 in its execution and parameters which change from time to time in the execution. These memories are interconnected by a host bus 24 composed of a CPU bus and a memory bus.

The host bus 24 is connected to an external bus 26 such as a PCI (Peripheral Component Interconnect/Interface) via a bridge 25.

A keyboard 28 is operated by the user to enter various commands into the CPU 21. A mouse 29 is operated by the user to specify or select points on the screen shown on a CRT (Cathode Ray Tube) display 30. The CRT display 30 displays various kinds of information in text and image.

A HDD (Hard Disk Drive) 31 and a FDD (Floppy disk Drive) 32 drive a hard disk 31A and a floppy disk 32A respectively to record programs (for example, a WWW browser 91, a preset recording setting program 92, a recording control program 93 (each will be described with reference to FIG. 10)) and information to or reproduce these programs and information from these recording media.

The hard disk 31A of the personal computer 1 stores command sets for controlling the VCR 2. The command sets are prepared for every maker and model of the VCR 2.

Referring to FIG. 3, there is shown an example of command sets for controlling the VCR 2 stored in the hard disk 31A. As shown in FIG. 3, the hard disk stores the commands for specifying the channel to be recorded and recording start and end times for each VCR maker model (year of production). The addresses of these commands on the hard disk 31A on which these commands are stored are shown.

In the example shown in FIG. 3, in command set A, a command for specifying "NHK (trademark) General" as a channel to be recorded for VCR models (SS10, SS20, SS200, and SS220) manufactured "between 1990 and 1999" by "SONI" is stored at address "A0", a command for specifying "NHK Educational (trademark)" at address "A1", and a command for specifying "Nihon TV (trademark) at address "A2". A command for specifying "start recording" is stored at address "A10" and a command for specifying "end recording" at address "A11".

Likewise, command set B corresponding to the VCRs (SS2000, SS2100 and SS2200) manufactured by "SONI" after year "2000", command set C corresponding to the VCRs (PP50, PP55 and PP60) manufactured by "Panason" between "1990 and 1999", command set D corresponding to the VCRs (PP200, PP210 and PP220) manufactured after year "2000,"and command set E corresponding to the VCRs (TT05 and TT10) manufactured by "Toshibe" between "1990 and 1999" are stored Namely, when the user of the personal computer 1 registers the model of the VCR 2 according to a VCR registration program, the CPU 21 searches the hard disk 31A for the command set corresponding to that VCR 2 and sets the retrieved command set as one that is used for the VCR 2.

It should be noted that, if the command set corresponding to the VCR 2 is not stored on the hard disk 31A, then the CPU 21 accesses the EPG server 7 through a communication board 36 to download the corresponding command set and sets the obtained command set as one that is used for the VCR 2.

Referring to FIG. 2 again, a speaker 33 sounds a predetermined audio signal. The personal computer 1 is also connected to the video mouse 1A. The video mouse 1A is connected to the personal computer via the USB cable 1B connected to a USB port 34, which is connected to an interface 27 like other processing sections.

These components, the keyboard 28 through the USB port 34, are connected to the interface 27, which is connected to the CPU 21 via the external bus 26, the bridge 25, and the host bus 24.

The image processing board 35, connected to the CPU 21 via the external bus 26, the bridge 25, and the host bus 24, generates, under the control of the CPU 21, predetermined image or audio data on the basis of a signal supplied from the antenna 3 and outputs the generated data to the hard disk drive 31 via the external bus 26 and the interface 27.

The communication board 36 is a device for connecting the personal computer 1 to the public switched line network 4. To be specific, the communication board 36 is constituted by an Ethernet (trademark) board for example connected to the CPU 21 via the external bus 26, the bridge 25, and the host bus 24.

Figure 4:
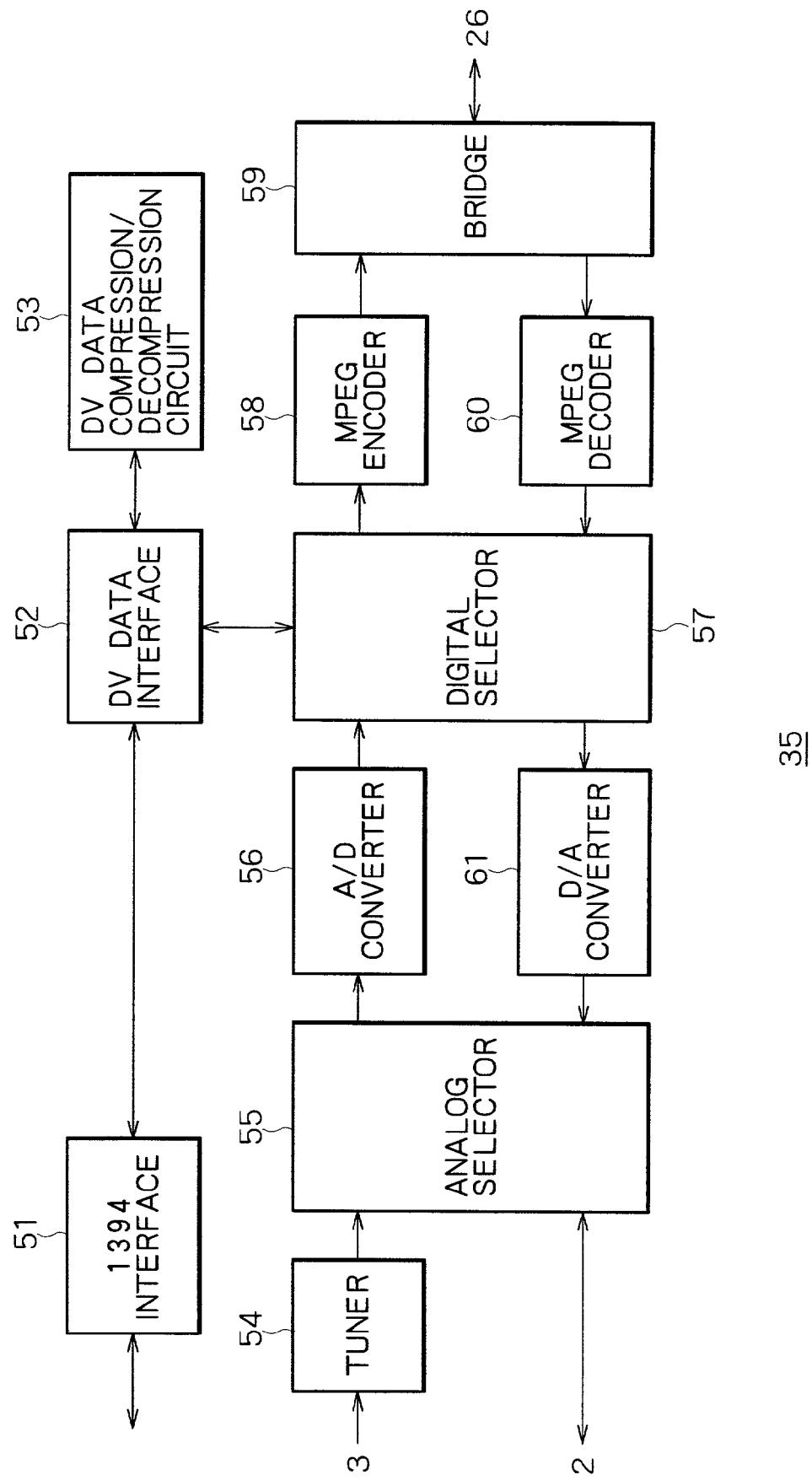
FIG. 4 is a block diagram illustrating a configuration of an image processing board shown in FIG. 3.

Referring to FIG. 4, there is shown a block diagram which illustrates a configuration of the image processing board 35 in detail.

A 1394 interface 51 receives image or audio digital data having DVCR (Digital Video Cassette Recorder) format supplied from a device having an output configuration compliant with the IEEE (Institute of Electrical and Electronics Engineers) 1394 standard from a DVCR, not shown, and supplies the received digital data to a DV (Digital Video) data interface 52.

The 1394 interface 51 also supplies the image or audio digital data of DVCR format received from the DV data interface 52 to the DVCR for example on the basis of a communication protocol compliant with the IEEE 1394 standard.

The DV data interface 52 outputs image or audio digital data having DVCR format supplied from the 1394interface or image or audio digital data (for example, digital data not compressed by 4:1:1) supplied from a digital selector 57 to a DV data compression/decompression circuit 53, image or audio digital data of DVCR format supplied from the DV data compression/decompression circuit 53 to the 1394interface 51, and image or audio non-compressed digital data supplied from the DV data compression/decompression circuit 53 to the digital selector 57.

The DV data compression/decompression circuit 53 decompresses the image or audio digital data of DVCR format supplied from the DV data interface 52 to output the decompressed data to the DV data interface 52 or compresses the non-compressed image or audio digital data of DVCR format supplied from the DV data interface 52 to output the compressed data to the DV data interface 52.

A tuner 54 captures an RF (Radio Frequency) signal supplied from the antenna 3 and outputs image and audio analog signals of a predetermined channel to an analog selector 55. The analog selector 55 selects one of the image or audio analogs signals supplied from the tuner 54, the VCR 2, and a D/A (Digital-to-Analog) converter 61 and outputs the selected signal to an A/D (Analog-to-Digital) converter 56 or the VCR 2.

The A/D converter 56 converts the image and audio analog signals supplied from the analog selector 55 into digital data and outputs the digital data to the digital selector 57.

The digital selector 57 captures the image and audio digital data supplied from the DV data interface 52, the A/D converter 56, or an MPEG decoder 60, selects one of the image and audio digital data, and outputs the selected data to the DV data interface 52, the MPEG encoder 58, or the D/A converter 61.

The MPEG encoder 58 compresses the image and audio digital data supplied from the digital selector 57 into digital data of MPEG format and outputs the MPEG digital data to a bridge 59. Also, the MPEG encoder converts a scene-change image into a still image and outputs this still image to the bridge 59.

The bridge 59 outputs the non-compressed image and audio digital data supplied from the digital selector 57 to the CRT display 30 via the external bus 26 and the interface 27 of the personal computer 1 installed with the image processing board 35.

The bridge 59 outputs the image or audio digital data of MPEG format supplied from the MPEG encoder 58 to the hard disk drive 31 or the CPU 21 via the external bus 26 of the personal computer 1 installed with the image processing board 35.

Further, the bridge 59 receives the image or audio digital data of MPEG format from the hard disk drive 31 of the personal computer 1 via the external bus 26 and outputs the received data to the MPEG decoder 60.

The MPEG decoder 60 decompresses the image or audio digital data of MPEG format supplied from the bridge 59 and outputs the decompressed image or audio data to the digital selector 57.

The D/A converter 61 converts the image and audio digital data supplied from the digital selector 57 into an analog signal and outputs the analog signal to the analog selector 55.

It should be noted that the processing of the MPEG encoder 58 or the MPEG decoder 60 may be assumed by the CPU 21 by use of a predetermined computer program.

Figure 5:
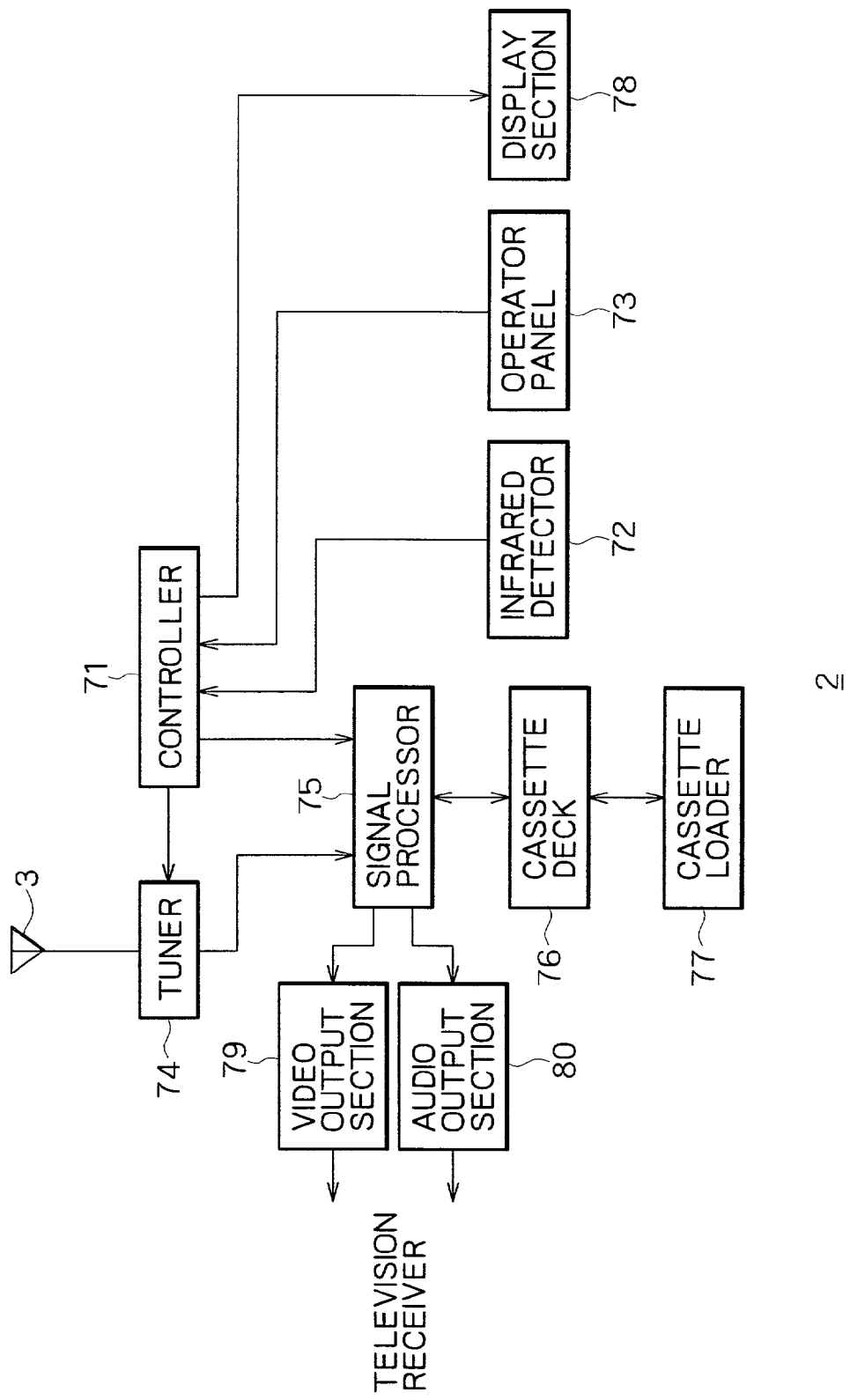
FIG. 5 is a block diagram illustrating a configuration of a VCR shown in FIG. 1.

Referring to FIG. 5, there is shown a block diagram illustrating an exemplary internal configuration of the VCR 2.

A controller 71 has a CPU, a ROM, and a RAM, not shown, to control the overall operation of the VCR 2. The controller 71 controls various operations on the basis of the signals received at an infrared signal receiver 72 or the commands inputted by the user at an operator panel 73.

A tuner 74 captures an RF signal supplied from the antenna 3, demodulates the image and analog signals (program signals) of a user-specified channel, and outputs the demodulated signals to a signal processor 75.

The signal processor 75 processes the television program signals supplied from the tuner 74 under the control of the controller 71. For example, if the user specifies the recording of a program by means of a remote controller or the video mouse 1A, the signal processor 75 records, by driving a cassette deck 76, the program signal supplied from the tuner 74 to a video cassette, not shown, loaded in a cassette loader 77.

The cassette deck 76 records the signal supplied from the signal processor 75 to a video cassette loaded in the cassette loader 77. Also, the cassette deck 76 reads signals from the video cassette and supplies the signal to the signal processor 75.

A display section 78 displays the operation status and so on of the VCR 2 under the control of the controller 71.

The signal processor 75 supplies the program signal supplied from the tuner 74 and the video signals extracted from the program signal recorded to the video cassette to a video output section 79 and the audio signal thus obtained to an audio output section 80. The video output section 79 and the audio output section 80 output the supplied signals to a television receiver, not shown.

It should be noted that the configurations of the access server 5, he EPG server 7, the WWW servers 8-1 through 8-N, and the management control apparatus 9 are basically the same as that of the personal computer 1 and therefore their descriptions are skipped.

Figure 6:
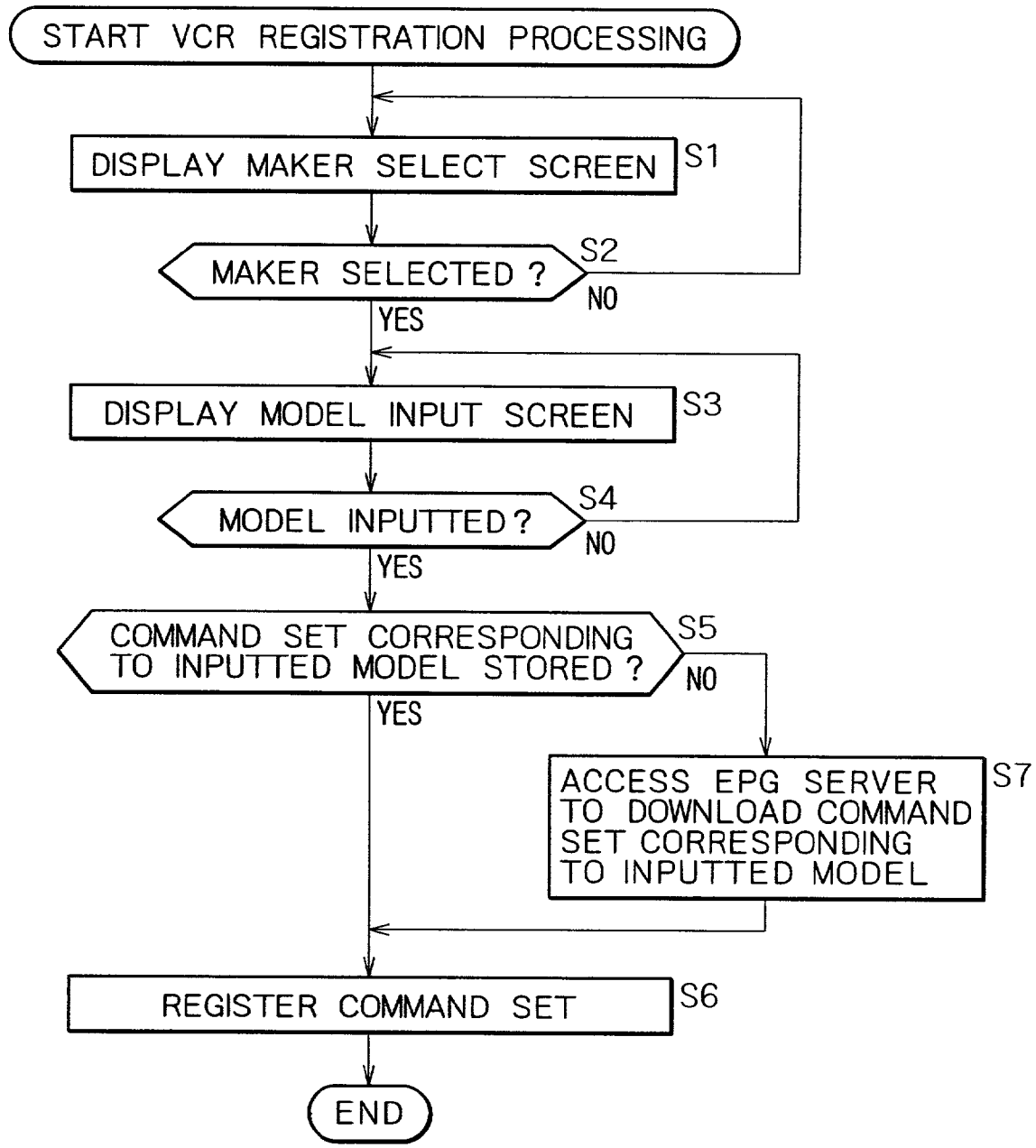
FIG. 6 is a flowchart describing registration processing of the VCR shown in FIG. 1.

The following describes the user registration of the model of the VCR 2 with the personal computer 1 with reference to the flowchart shown in FIG. 6. The registration processing starts when the user operates the keyboard 28 for example to specify the execution of the processing.

In step S1, in response to the user specification, the CPU 21 displays a maker select screen on the CRT display 30.

Figure 7:
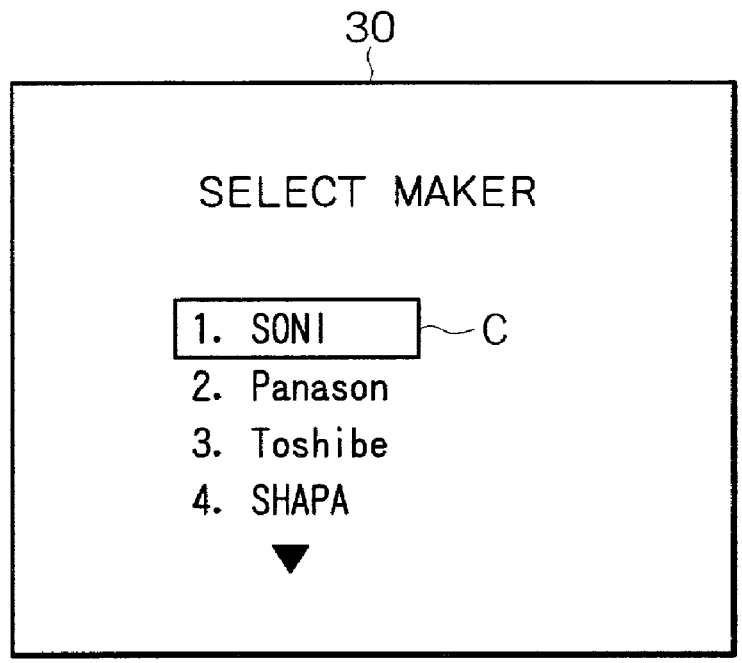
FIG. 7 shows an exemplary registration screen.

Referring to FIG. 7, there is shown an exemplary maker select screen displayed on the CRT display 30. In this example, "SONI" is shown as maker 1, "Panason" as maker 2, "Toshibe" as maker 3, and "SHAPA" as maker 4. Scrolling the screen displays other maker names. In this example, cursor C is located at "SONI". By moving cursor C, the user can select any desired VCR 2 maker.

In step S2, the CPU 21 determines whether a maker has been selected and waits, with the maker select screen displayed, until the selection is made.

If a maker name is found selected by the user, the CPU 21 goes to step S3.

In step S3, the CPU 21 displays a model input screen on the CRT display 30.

Figure 8:
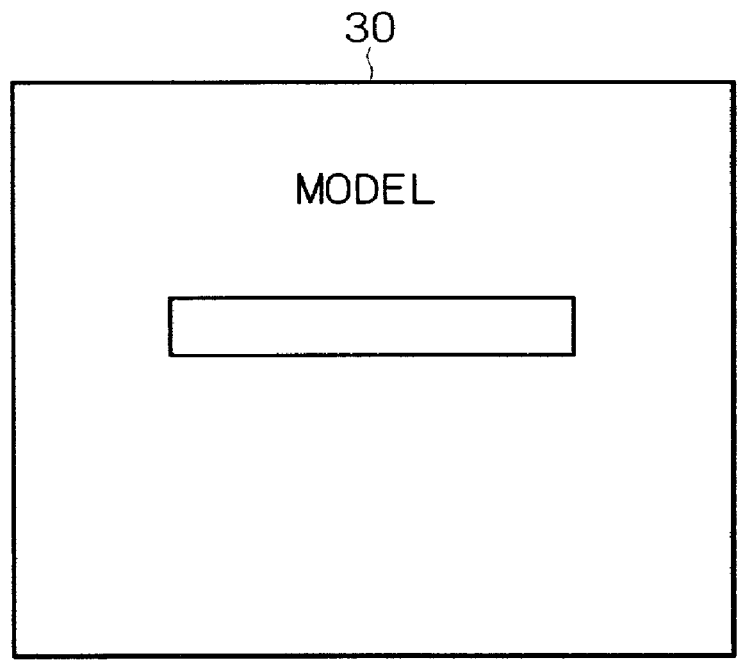
FIG. 8 shows another exemplary registration screen.

Referring to FIG. 8, there is shown an exemplary model input screen displayed on the CRT display 30. In this example, the user enters the model name of the user's VCR 2 into the rectangular box by operating the keyboard 28 for example.

In step S4, the CPU 21 determines whether the model name has been entered and waits, with the input screen displayed, until the entry is made.

If the model name of the VCR 2 is found entered in step S4, the CPU 21 goes to step S5.

In step S5, the CPU 21 determines whether a command set corresponding to the selected maker and model is recorded on the hard disk 31A by retrieving the command set information as shown in FIG. 3.

If the command set corresponding to the model is found recorded on the hard disk 31A in step S5, then the CPU 21 goes to step S6 to register this command set at the RAM 23 or the hard disk 31A as a command set to be used for the VCR 2.

Subsequently, if the program start time is found reached with reference to the downloaded preset recording data for example, the CPU 21 uses the command set registered in step S6 to transmit information about recording start time and recording channel to the VCR 2.

On the other hand, if the command set corresponding to the entered model is not found recorded on the hard disk 31A, the CPU 21 goes to step S7.

In step S7, the CPU 21 accesses the EPG server 7 through the communication board 36 to download the command set corresponding to the entered model name. The downloaded command set is recorded on the hard disk 31A for example and registered as a command set to be used for the VCR 2 in step S6.

Figure 9:
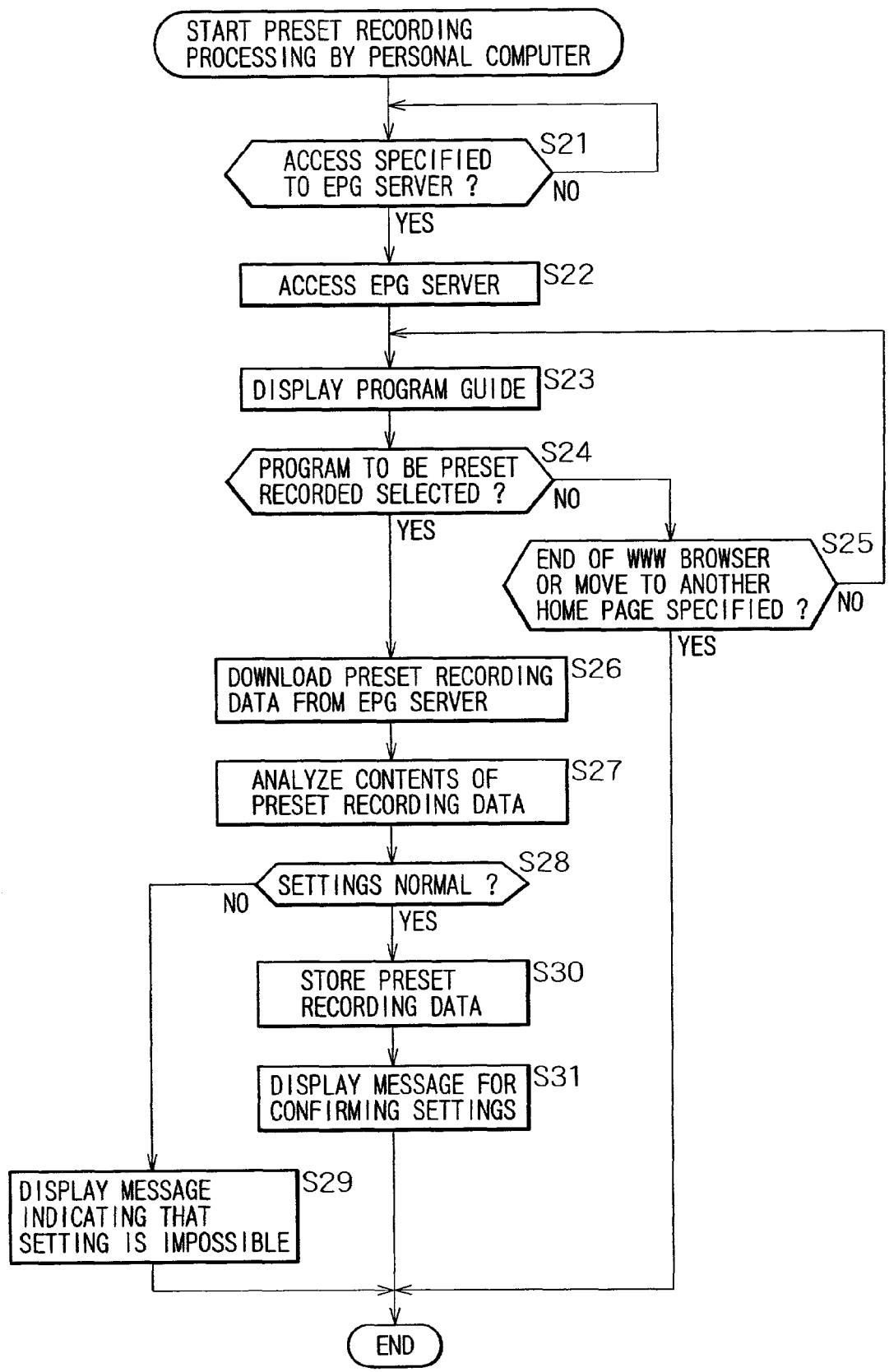
FIG. 9 is a flowchart describing a processing operation by the personal computer shown in FIG. 1.

The following describes, with reference to the flowchart shown in FIG. 9, the selection in the personal computer 1 by the user of a television program to be preset recorded from a program guide stored in the EPG server 7. It should be noted that the following description will be made by appropriately referencing the exemplary displays on the CRT display 30 and exemplary preset recording data shown in FIGS. 10 through 15.

In step S21, the CPU 21 determines whether the access to the EPG server 7 has been specified and waits until the access is specified.

Figure 10:
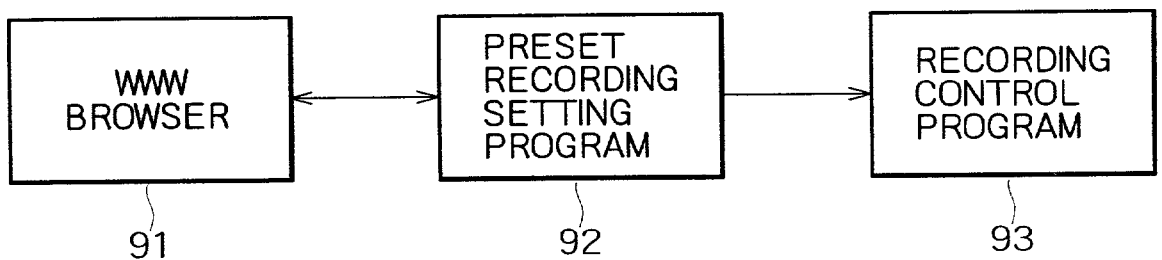
FIG. 10 shows application programs to be executed by the personal computer shown in FIG. 1.

Referring to FIG. 10, there is shown computer programs to be executed by the CPU 21. If the user wants to set the preset recording to the VCR 2 by use of the preset recording data downloaded from the EPG server 7, the user starts a WWW browser 91 and specifies the access to the EPG server 7 at the keyboard 28 or the mouse 29. In response, the CPU 21 determines that the access to the EPG server 7 has been specified and goes to step S22.

In step S22, the CPU 21 executing the WWW browser 91 accesses the EPG server 7 via the public switched line network 4, the access server 5, and the Internet 6. In step S23, the CPU 21 executing the WWW browser 91 receives an HTML file from the EPG server 7 to display a program guide shown in FIG. 11 for example on the CRT display 30.

In the program guide shown in FIG. 11, download buttons 101-1 through 101-11 are arranged for downloading predetermined preset recording data, as associated with each of the television programs.

For example, when the download button 101-1 is pressed, the preset recording data for preset recording "7 O'clock News" of NHK General are downloaded to the personal computer 1. When the download button 101-2 is pressed, the preset recording data for preset recording "TV Map" of NHK General are downloaded to the personal computer 1. Likewise, pressing any of the download buttons 101-3 through 101-11 downloads the corresponding program preset recording data to the personal computer 1.

In step S24, the CPU 21 executing the WWW browser 91 determines whether a television program to be preset recorded has been selected; namely, any one of the download buttons 101-1 through 101-11 has been pressed.

If a television program to be preset recorded is found not selected, the CPU 21 goes to step S25 to determine whether the end of the WWW browser 91 or the move to another home page has been specified. If the end of the WWW browser 91 or the move to another home page is found specified from the keyboard 28 or the mouse 29, then the CPU 21 ends the program preset recording processing and executes the newly specified processing.

On the other hand, if the end of the WWW browser 91 or the move to another home page is found not specified in step S25, the CPU 21 returns to step S23 to continue the program guide display processing.

If the user pressed any one of the download buttons by operating the keyboard 28 or the mouse 29 in step S24, the CPU 21 executing the WWW browser 91 recognizes that a program to be preset recorded has been selected and goes to step S26.

In step S26, the CPU 21 executing the WWW browser 91 further downloads the preset recording data of TVPI (Television Program Information) format from the EPG server 7. At this moment, as shown in FIG. 10, a preset recording setting program 92 starts, to which the downloaded preset recording data are passed for the analysis and extraction of the data necessary for the preset recording.

Referring to FIG. 12, there is shown exemplary preset recording data of TVPI format. The preset recording data are constituted by text data. It should be noted that the preset recording data shown in FIG. 12 are those which have been downloaded by pressing the download button 101-10 shown in FIG. 11.

In this example, "Subject:TVPI200006021900" indicates a control command for this data to record. "Content-type: application/x-tv-program-info;charset=shift_jis" on the second line of the preset recording data indicates that this data is preset recording data. On the fourth line of the preset recording data, "station:" is followed by the data for identifying a channel to be recorded. For example, in "station: Nihon TV" in FIG. 12, the identification data is "Nihon TV."

The channel identification data allows an ambiguous description within a predetermined range. The ambiguously described data are converted by the processing using a channel conversion file shown in FIG. 13 into the data for identifying a predetermined channel (or station).

In a character string "4, 0, 0, 4, Nihon TV, Nihon TV, Nittele, Nihon TV Broadcast Network (trademarks), NTV" for example in the channel conversion file, the leftmost "4" is the data for channel identification, the rightmost "4" is channel display data, and the first "Nihon TV" is data for displaying channel name. The following "Nihon TV, Nittele, Nihon TV Broadcast Network, NTV" is a character string for taking a match with a predetermined character string in the channel conversion file.

For example, if "station: Nihon TV" is written on the fourth line of the preset recording data, the CPU 21 executing the preset recording setting program 92 determines whether "Nihon TV" following "station:" matches the character string located to the right of the fifth comma from the left in the channel conversion file.

As shown in the example of FIG. 13, if the channel conversion file includes the character string "4, 0, 0, 4, Nihon TV, Nihon TV, Nittele, Nihon TV Broadcast Network, NTV", then the CPU 21 executing the preset recording setting program 92 determines that there is a match between the character string "Nihon TV" (located to the right of the fifth comma from the left) and the character string in the channel conversion file.

If a match is found between the character string of the preset recording data and the character string of the channel conversion file, the CPU 21 executing the preset recording setting program 92 recognizes, as a channel, the channel identification data on the same row in the matching channel conversion file.

Therefore, if the character string for specifying the channel of preset recording data is any one of "Nihon TV", "Nittele", "Nihon TV Broadcast Network", and "NTV" for example, the CPU 21 executing the preset recording setting program 92 can recognize the channel as "4" on the basis of the preset recording data.

Thus, even if the character string for a channel of the preset recording data is ambiguous to a certain degree, the CPU 21 executing the preset recording setting program 92 can recognize a predetermined channel on the basis of the preset recording data.

Likewise, the fifth through eighth lines of the preset recording data are written with the data for identifying recording start date and time and the ninth line is written with the data for identifying recording end time.

In the example shown in FIG. 12, recording start date is "Jun. 2, 2000", recording start time is "19:00" and recording end time is "20:54". On the basis of this information, the CPU 21 executing the preset recording setting program 92 can recognize the broadcast channel, broadcast date, broadcast start time, and broadcast length of time necessary for preset recording.

Returning to the description with reference to FIG. 9, the preset recording data as described above downloaded in step S26 are received by the communication board 36 via the Internet 6 and so on to be transferred to the CPU 21.

In step S27, the CPU 21 executing the preset recording setting program 92 analyzes the received preset recording data. For example, if the user downloaded the preset recording data shown in FIG. 12 in step S26, the CPU 21 determines that the broadcast channel of the program to be recorded is "Nihon TV (4 channels)", the recording state date is "Jun. 2, 2000", the program start time is "19:00", and the program end time is "20:54".

In step S28, the CPU 21 executing the preset recording setting program 92 determines whether the settings (or parameters) of the downloaded preset recording data are normal or not, namely, for example, whether there is an overlap between the recording time of the preset recording data stored in the RAM 23 for example and the recording time of the preset recording data downloaded this time.

If the settings are found not normal in step S28, namely, there is an overlap between the recording time of the downloaded preset recording data stored in the RAM 23 and the recording time of the preset recording data downloaded this time, the CPU 21 goes to step S29.

In step S29, the CPU 21 executing the preset recording setting program 92 displays a message that the setting of preset recording is impossible on the CRT display 30.

Referring to FIG. 14, there is shown an exemplary message to be displayed on the CRT display 30 in step S29. In this example, message "You cannot preset this program for recording because the data of preset recording number 1 partially overlap with recording time" is displayed. Namely, the RAM 23 already stores the program of preset number 1. It should be noted that not only the message telling that the settings are improper but also information such as already preset program names, recording start times, and recording end times for example may be displayed. This allows the users of the personal computer 1 to know that the preset recording of particular programs is disabled. Then, the setting of preset recording comes to an end.

On the other hand, if the settings of the preset recording data are found normal in step S28, the CPU 21 executing the preset recording setting program 92 goes to step S30, in which the CPU 21 stores the downloaded preset recording data into the RAM 23 as a television program to be recorded at the VCR 2 (hereinafter referred to as a preset recording program).

In step S31, the CPU 21 executing the preset recording setting program 92 generates a message as shown in FIG. 15 for example and displays it on the CRT display 30 to have the user confirm the contents of the preset recording.

In the example shown in FIG. 15, message "Setting of preset recording has been completed. Preset number: 2" is displayed. Namely, the program selected from the program guide provided by the EPG server 7 has been registered in the RAM 23 as the program having preset number 2. It should be noted that not only the message telling the completion of the preset recording setting but also the information such as program name, recording start time, recording end time, and recording mode for example may be displayed. Then, the setting of the preset recording comes to an end.

Figure 16:
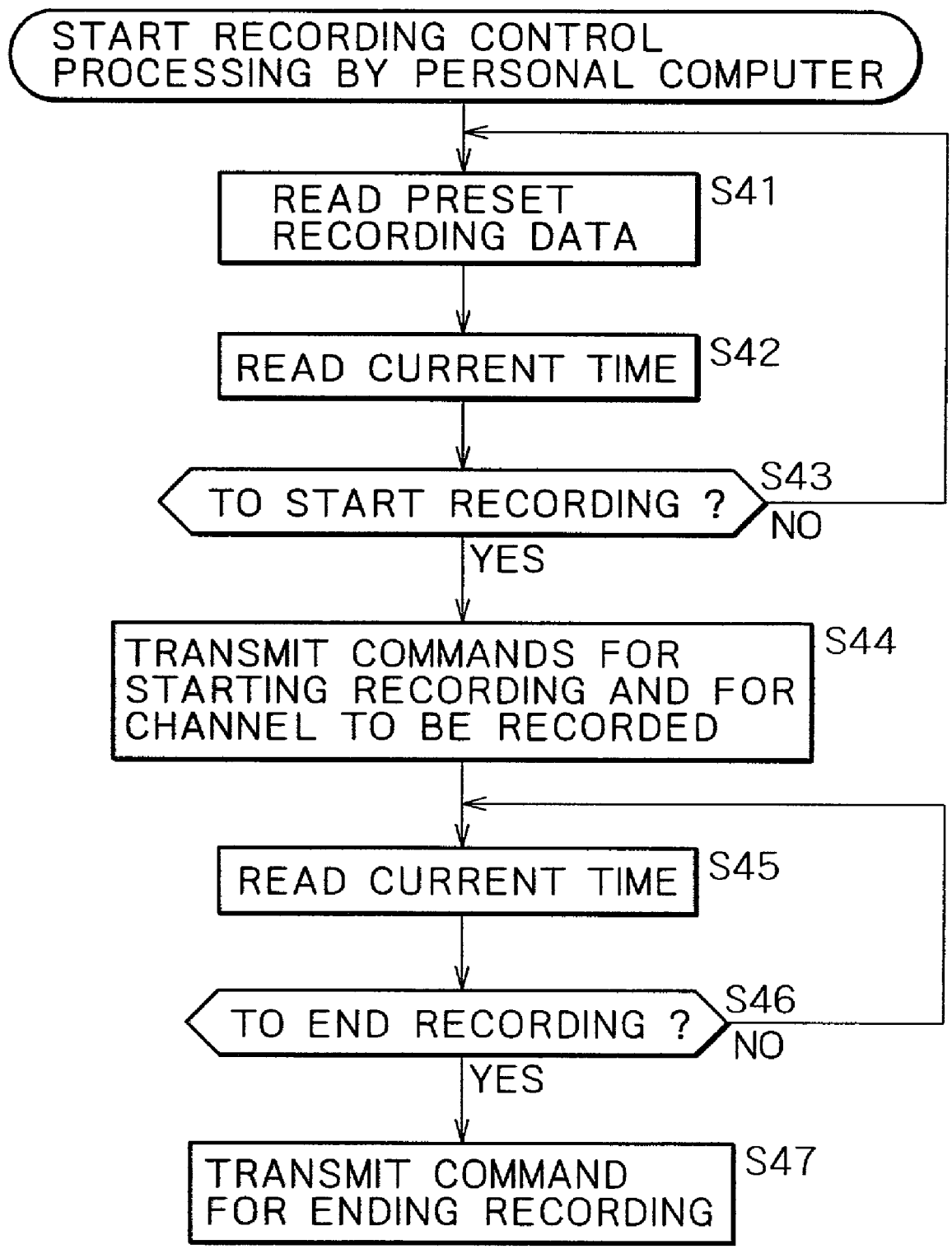
FIG. 16 is a flowchart describing another processing operation by the personal computer shown in FIG. 1.

The following describes the control operation of the personal computer 1 in controlling the recording of television programs on the VCR 2 with reference to the flowchart shown in FIG. 16. This processing starts when the preset recording data downloaded from the EPG server 7 are stored in the RAM 23, upon which the CPU 21 starts a recording control program 93 (FIG. 10).

In step S41, the CPU 21 executing the recording control program 93 reads the preset recording data from the RAM 23 and, in step S42, reads the current time from an RTC (Real Time Clock), not shown.

In step S43, the CPU 21 executing the preset recording control program 93 compares the recording start time included in the preset recording data read in step S41 with the current time read in step S42, thereby determining whether to start the recording. Until the starting of the recording is determined, the CPU 21 repeats the processes of steps S41 through S43.

In step S43, if the CPU 21 executing the preset recording control program 93 determines that there is a program among the programs preset for recording in the RAM 23 which is to start for recording, then the CPU 21 goes to step S44, in which the CPU 21 starts recording that program.

Namely, in step S44, the CPU 21 executing the preset recording control program 93 extracts commands for specifying channel of the program to be recorded on the VCR 2 and the recording start time from the command set corresponding to the model of the VCR 2 registered in step S6 shown in FIG. 6 and transmits the extracted commands from the video mouse 1A to the VCR 2 as an infrared signal.

The controller, not shown, of the video mouse 1A drives a light emitting diode, not shown, in a predetermined timed relation in accordance with the command received from the CPU 21 through the USB cable 1B.

For example, if the VCR 2 is "SS10" manufactured by maker "SONI" (between 1990 and 1999), command set A (FIG. 3) has been registered in step S6 shown in FIG. 6, and the preset recording data read in step S41 are the data shown in the example of FIG. 12, then the CPU 21 executing the preset recording control program 93 extracts a command stored at "address A2" for specifying "Nihon TV" as the channel to be recorded a command stored at "address A10" as a command corresponding to recording start and transmits the extracted commands to the VCR 2.

Receiving the commands transmitted in step S44 at the infrared signal receiver 72, the VCR 2 starts the recording process based on the commands. The processing of the VCR 2 will be described with reference to the flowchart shown in FIG. 17.

In step S45, the CPU 21 executing the preset recording control program 93 reads the current time from the RTC, not shown. In step S46, the CPU 21 compares the current time read in step S45 with the recording end time included in the preset recording data read from the RAM 23 to determine whether to end the recording or not.

If the recording is found not be ended in step S46, the CPU 21 executing the recording control program 93 returns to step S45 and waits until the time to end the recording comes.

If the CPU 21 executing the recording control program 93 determines in step S46 to end the recording, then the CPU 21 goes to step S47 to transmit the recording end command from the video mouse 1A by use of the command set corresponding to the VCR 2. Namely, the CPU 21 executing the recording control program 93 transmits the recording end command stored at "address A11" to the VCR 2.

Receiving the recording end command, the VCR 2 ends the recording of the television program, upon which the CPU 21 ends the recording control processing.

Figure 17:
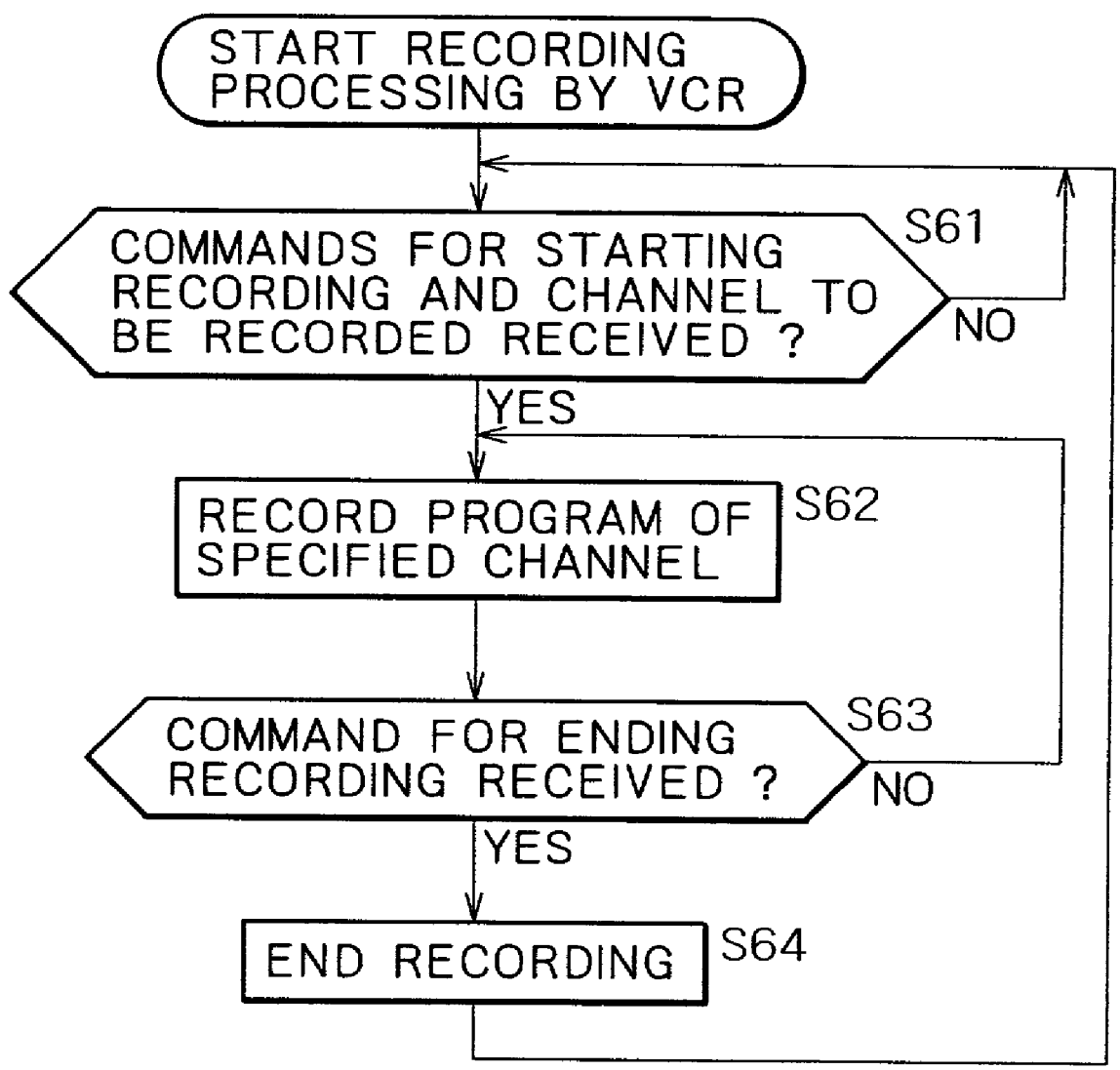
FIG. 17 is a flowchart describing processing by VCR shown in FIG. 1.

The following describes the processing of the VCR 2 for recording a television program in accordance with the commands issued by the personal computer 1 with reference to the flowchart shown in FIG. 17.

In step S61, the controller 71 of the VCR 2 determines whether the recording start and recording channel specification commands from the video mouse 1A of the personal computer 1 have been received at the infrared signal receiver 72. The controller 71 waits until these commands are received.

If the commands from the personal computer 1 are found received at the infrared signal receiver 71 in step S61, the controller 71 goes to step S62 to analyze the contents of these commands, starting a recording operation.

For example, if the commands transmitted from the personal computer 1 are those in which the description contents of the TVPI data shown in FIG. 12 have been transmitted by use of command set A (FIG. 3) (namely, the exemplary commands referenced in the description shown in FIG. 16), then the controller 71 instructs the tuner 74 to tune in "Channel 4" and the signal processor 75 to demodulate the program signal supplied from the tuner 74 in step S62. Consequently, the television program demodulated by the signal processor 75 is supplied to the cassette deck 76 to be recorded to a video cassette loaded in the cassette loader 77.

In step S63, the controller 71 determines whether the recording end command from the personal computer 1 has been received at the infrared signal receiver 72 and executes the processing of step S62 until this command is received, continuing the recording processing.

If the recording end command is found received at the infrared signal receiver 72 in step S63, the controller 71 goes to step S64, in which the controller 71 controls each component device to end the recording processing. Then, the controller 71 returns to step S61 to repeat the above-mentioned processes.

As described above, the user of the personal computer 1 can set the preset recording of a television program on the VCR 2 by use of the corresponding preset recording data of TVPI format stored in the EPG server 7.

In the above-mentioned examples, the preset recording data downloaded from the EPG server 7 are used to execute a preset recording operation at the personal computer 1. It is also practicable to set preset recording on such information processing terminals as a mobile phone and a PDA (Personal Digital Assistant).

In this case, the user selects on a mobile phone a television program to be preset recorded from a program guide having compact HTML format stored in the EPG server 7 and download the corresponding preset recording data. When a predetermined time comes, the mobile phone transmits the same commands as those used with the personal computer 1 to the VCR 2 as an infrared signal, thereby controlling the recording processing at the VCR 2. It should be noted that, in order to register the command sets for use by the mobile phone, the user must register the model name of the VCR 2 at the mobile phone.

If the VCR 2 is connected to the Internet 6 via the public switched line network 4 for example, the user may access the EPG server 7 from the VCR 2 and downloads the above-mentioned preset recording data to set the preset recording of a television program. It should be noted that, if the controller 71 of the VCR 2 cannot analyze the contents of downloaded preset recording data, a conversion program stored in a storage section, not shown, of the controller 71 is used.

In the above-mentioned examples, the device on which television programs are recorded is the VCR 2. It will be apparent that this device may also be a hard disk recorder or a DVCR for example which can record television programs.

The commands for controlling the VCR 2 may be transmitted not only as infrared signals, but also as wireless signals based on the Bluetooth standard for example.

In the above-mentioned examples, the command set for each VCR model is prepared in the hard disk 31A of the personal computer 1. It will be apparent that the command set corresponding to the VCR 2 may be obtained by accessing any of the WWW servers 8-1 through 8-N to register the model name of the VCR 2.

In the above-mentioned examples, the CPU 21 performs time management and the control commands are transmitted when the CPU 21 determines that a program start or end time has come. It will be apparent that the description contents of the preset recording data may be transmitted to the VCR 2 by use of the command set corresponding thereto to perform preset recording at the VCR 2 (namely, the VCR 2 performs time management). In this case, a G-code may be transmitted from the personal computer 1 to the VCR 2.

The above-mentioned sequences of processes may be executed by hardware but they may also be executed by software. The execution by software is supported by a computer in which the programs constituting this software are stored in a dedicated hardware storage device or a general-purpose personal computer for example in which these programs are installed from a program storage medium.

The program storage medium storing the programs which are installed in a general-purpose personal computer for example to be made executable by the computer is a package medium constituted by the magnetic disk 111 (including floppy disk), the optical disk 112 (including CD-ROM (Compact Disk Read Only Memory) and DVD (Digital Versatile Disk)), the magneto-optical disk 113 (including MD (Mini-Disc)), or the semiconductor memory 114 as shown in FIG. 2 or the program storage medium is constituted by the flash ROM 22 or the hard disk 31A for example which stores the programs on a temporary or permanent basis. As required, the programs are stored in the program storage medium by use of wired or wireless communications medium such as the public switched line network 4, a local area network, the Internet 6, or digital satellite broadcasting via such interface as router or modem.

The steps describing the programs provided by the above-mentioned program storage medium include not only processes which are executed in the described sequence in a time-dependent manner but also processes which are executed in parallel or discretely.

It should be noted that term "system" herein denotes an entire apparatus constituted by a plurality of devices.

As described and according to the invention, the information processing apparatus, the information processing method and the programs stored in the program storage medium retrieve the code information corresponding to the identification information of a recording apparatus from the control information downloaded from a program information providing apparatus to transmit the obtained code information to the recording apparatus. This novel constitution allows each user to easily and quickly control the preset recording of programs on the recording apparatus of any maker.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus comprising:
    program acquiring means for selectively acquiring a television program from a program source;
    means for storing said acquired television program in a storage device of said information processing apparatus;
    means for selectively viewing said acquired television program;
    control information acquiring means for acquiring from a program information providing apparatus control information for controlling preset recording of a program;
    identification information acquiring means for acquiring identification information for identifying a recording apparatus by which said program is recorded;
    code information acquiring means for acquiring, on the basis of said identification information acquired by said identification information acquiring means, code information for controlling said recording apparatus, said code information correspondingly employed with said control information acquired by said control information acquiring means, said code information acquiring means comprising:
        determination means for determining whether code information corresponding to said identification information is recorded in a memory of said information processing apparatus; and
        accession means for accessing, if said determination means determines that said code information is not recorded in said memory, a server apparatus to download said code information;
    code transmitting means for transmitting said code information acquired by said code information acquiring means to said recording apparatus.

2. The information processing apparatus according to claim 1, wherein said code information instructs said recording apparatus to execute one of operations for starting and ending a recording session.

3. The information processing apparatus according to claim 1, wherein said transmitting means transmits said code information which instructs said recording apparatus to execute a preset recording operation.

4. The information processing apparatus according to claim 1, wherein said identification information acquiring means acquires a maker name and a model name of said recording apparatus as said identification information.

5. The information processing apparatus according to claim 1, wherein said code information acquiring means acquires said code information through a network.

6. The information processing apparatus according to claim 1, wherein said control information includes broadcast channel information, broadcast date, broadcast start time, and broadcast end time of said program.

7. The information processing apparatus according to claim 1, further comprising:
   image processing means for generating predetermined image and/or audio data on the basis of an input signal and for outputting the data to said memory.

8. An information processing method comprising:
   selectively acquiring a television program from a program source;
   storing said acquired television program in a storage device of an information processing apparatus;
   selectively viewing said acquired television program;
   acquiring from a program information providing apparatus control information for controlling preset recording of a program;
   acquiring identification information for identifying a recording apparatus by which said program is recorded;
   acquiring, on the basis of said identification information acquired in said identification information acquiring, code information for controlling said recording apparatus, said code information correspondingly employed with said control information acquired during said control information acquiring, said code information acquiring comprising:
      determining whether code information corresponding to said identification information is recorded in a memory of an information processing apparatus; and
      accessing, if said determining determines that said code information is not recorded in said memory, a server apparatus to download said code information; and
   transmitting said code information acquired during said code information acquiring to said recording apparatus.

9. A computer-readable storage medium, including computer program instructions which cause a computer to implement a method of information processing, comprising:
   selectively acquiring a television program from a program source;
   storing said acquired television program in a storage device of an information processing apparatus;
   selectively viewing said acquired television program;
   acquiring from a program information providing apparatus control information for controlling preset recording of a program;
   acquiring identification information for identifying a recording apparatus by which said program is recorded;
   acquiring, on the basis of said identification information acquired in said identification information acquiring , code information for controlling said recording apparatus, said code information correspondingly employed with said control information acquired during said control information acquiring, said code information acquiring comprising:
      determining whether code information corresponding to said identification information is recorded in a memory of an information processing apparatus; and
      accessing, if said determining determines that said code information is not recorded in said memory, a server apparatus to download said code information; and
   transmitting said code information acquired during said code information acquiring to said recording apparatus.

* * * * *